INVENTORS
KIE Y. AHN
JOSEPH M. VIGGIANO

BY Bernard N. Wiener
ATTORNEY

United States Patent Office

3,573,981
Patented Apr. 6, 1971

3,573,981

METHOD AND APPARATUS FOR INDUCING UNIAXIAL ANISOTROPY IN MAGNETIC FILM THEREBY, AND MEMORY USING THE FILM

Kie Y. Ahn, Bedford, and Joseph M. Viggiano, Yonkers, N.Y., assignors to International Business Machines Corporation, Armonk, N.Y.

Filed Dec. 14, 1967, Ser. No. 690,589
Int. Cl. C23c *13/02, 13/04*
U.S. Cl. 117—240 15 Claims

ABSTRACT OF THE DISCLOSURE

This disclosure provides a magnetic film with induced uniaxial anisotropy, i.e., a film with an easy axis and a hard axis for magnetization. The practice of the disclosure includes deposition of partially ionized components of a magnetic material onto a heated substrate in the presence of an applied electric field adjacent to and contiguous with the surface of the substrate. The easy axis of the induced uniaxial anistropy in the deposited magnetic film is in the direction of the applied electric field in the film. The magnitudes of the temperature of the surface of the substrate and of the electric field control both the magnitude and direction of the uniaxial anisotropy in the film. The degree of ionization of the components of the film during vapor transport to the surface of the substrate establishes another control of the resultant induced uniaxial anisotropy in the film. Exemplary magnetic films for the practice of this disclosure are Ni-Fe of 81/19 ratio of the atomic components Ni and Fe and films of rare earth compounds and alloys, e.g., EuO compound and Eu-Gd alloys.

BACKGROUND OF THE INVENTION

This invention relates to magnetic films with induced anisotropy; and it relates more particularly to method and apparatus for inducing uniaxial anisotropy in a magnetic film during its growth on a substrate, to the film thereby and to a memory using the film.

The induced uniaxial anisotropy in a magnetic film acts in such a way that the magnetization tends to be directed along a certain direction termed the easy axis. The direction along which it is difficult to magnetize the film is called the hard axis. An expenditure of a particular amount of energy is required to magnetize a crystal to saturation in a hard direction compared to the lower energy required to saturate along a direction of easy magnetization. The excess energy required for magnetizing a magnetic film in the hard direction is the crystalline anisotropy energy.

Heretofore, uniaxial anisotropy has been induced in a magnetic film by presence of a magnetic field in the plane of the film during its growth. A background article presenting a description of this prior art practice is "Preparation of Thin Magnetic Films and Their Properties" by M. S. Blois, Jr., Journal of Applied Physics, vol. 26, No. 8, August 1955, pages 975–980. It is difficult to obtain homogeneity in the uniaxial anisotropy over a relatively large area of a magnetic film deposited on a substrate surface by the prior art practice with a magnetic field. Such homogeneity in the induced uniaxial anisotropy is a practical prerequisite for significant use of the film for a memory of a digital computer. Further, the prior art practice with a magnetic field for inducing uniaxial anisotropy in a magnetic film is not applicable where requisite conditions for growth of the film preclude effective use of the magnetic field. Illustratively, at the temperature for growth of a film of EuO, i.e., above 20° C., the film is nonmagnetic; and there is no physical mechanism by which the magnetic field itself can operate to induce anisotropy in the film. In contrast, the practice of this invention with an electric field is operable at any temperature that the film can form, since the electric field acts upon charge distribution which is essentially a parameter that does not depend on temperature.

Several compositions of nickel and iron have been utilized beneficially in the prior art for ferromagnetic films with both easy and hard axes. An indicative parameter of such films for practical applications is the quality factor $H_c/\alpha \cdot H_k$, where $H_c$ is the coercive force along the easy axis, $H_k$ is the anisotropy field along the hard axis, an $\alpha$ is the angular dispersion, i.e., the angular deviation of local anisotropy from the macroscopic easy axis. Another indicative parameter is the skew $\beta$ which measures the angular deviation of the easy axis of the resultant film from the direction of the orienting electric field.

OBJECTS OF THE INVENTION

It is an object of this invention to provide method and apparatus for inducing uniaxial anisotropy in a magnetic film through use of an applied electric field in the location of the film during its growth.

It is another object of this invention to provide method and apparatus for inducing uniaxial anisotropy in a magnetic film by applying an electric field in the plane of the growing film during deposition thereof from partially ionized components on a substrate surface.

It is another object of this invention to provide method and apparatus for inducing uniaxial anisotropy in a magnetic film which is being grown from partially ionized components by applying an electric field in the plane of the growing film on a substrate surface and selectively controlling the magnitude of both the electric field and the temperature of the surface of the substrate.

It is another object of this invention to provide method and apparatus for inducing uniaxial anisotropy in a magnetic film in accordance with each of the above identified objects which includes additionally controlling the degree of ionization of the components of the film during deposition thereof on the substrate surface.

It is another object of this invention to provide a magnetic film suitable for use in an information storage system.

It is another object of this invention to provide an information storage system which incorporates a magnetic film produced in accordance with the invention.

The foregoing and other objects, features, and advantages of the invention will be apparent from the following more particular description of a preferred embodiment of the invention, as illustrated in the accompanying drawings.

SUMMARY OF THE INVENTION

Figure 1:
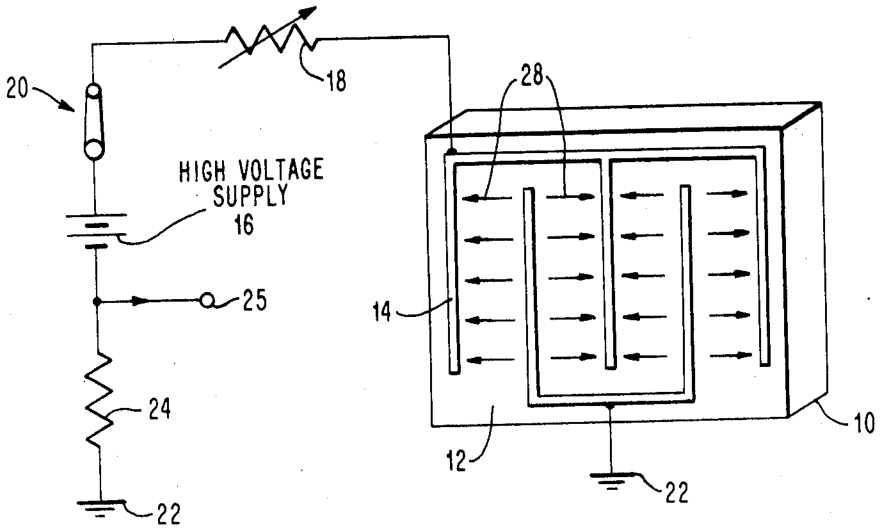
FIG. 1 is a schematic diagram of a substrate with conductors established thereon together with electrical circuitry whereby an electric field is established adjacent to and contiguous with the surface plane of the substrate for inducing uniaxial anisotropy in a magnetic film being grown on the substrate surface.

The practice of this invention provides a magnetic film with uniaxial anisotropy through use of an applied electric field in the plane of the film during its growth on a substrate surface from partially ionized components. In an exemplary system for applying the electric field and establishing the film, a source of magnetic material produces partially ionized components thereof which are deposited on a heated substrate. The electric field is established in the plane of the growing magnetic film by applying a potential between conducting members established on the substrate surface. By control of the magnitudes of both the applied electric field and the temperature of the substrate surface, the nature of the uniaxial anisotropy in the magnetic film is selectively controlled. Further, control of the degree of ionization of the components of the film also accomplishes control of the magnitude and direction of the induced uniaxial anisotropy in the film.

Other aspects of the practice of this invention include the magnetic film provided by the method or apparatus of the invention having special physical and geometrical properties, and the use of the film in an information storage system. The thin film information storage device is fabricated using a single film provided by the practice of this invention having uniaxial anisotropy, i.e., an easy axis of magnetization parallel to which the magnetic moments in the film are oriented in the absence of a magnetic field. Such film stores information by being caused to assume either a first stable state with the moments oriented in one direction along the easy axis, or a second stable state with the moments oriented in the opposite direction along the easy axis. The film can be operated at high speeds, since magnetization changes in the film can be effected by rotational switching, which is much faster than the predominate domain wall switching employed in other magnetic devices. A prior information storage system using a thin magnetic film is described in copending U.S. Patent application S.N. 337,199, filed Jan. 13, 1964, by H. Chang et al., and assigned to the assignee hereof.

Further, a beam addressable memory may be satisfactorily operated using films prepared in accordance with the practice of this invention. Such a beam addressable memory is presented in the following identified copending applications: S.N. 563,553, filed July 7, 1966, by G. F. Fan; S.N. 563,823, filed July 8, 1966, by G. F. Fan et al.; and S.N. 668,289, filed Sept. 8, 1967, by K. Y. Ahn et al.; all applications being assigned to the assignee hereof. For the writing operation for a film in a beam addressable memory, a film is established on a substrate. A beam or an electron beam source provides a focused beam to the upper surface of the film. A magnetic field source consisting of Helmholtz coils establishes a magnetic field in the plane of the film in a region thereof. In the presence of a magnetic field of approximately 20 oersteds, the region in the film is established with a magnetic film direction indicating binary bit, e.g., a binary "0." As the region has a significantly higher temperature than the surrounding material as a result of the laser or electron beam, it alone is established with a particular magnetic field orientation. Upon cooling, a region is written with binary information which is ready for the reading operation. The entire surface of the film is established selectively with written binary information. Within the state of the art, a region of three microns diameter can readily be established in a selected binary state. Therefore, a film primarily of rare earth oxide e.g., EuO, has a large capacity of the order of $10^7$ bits/in$^2$.

The retrieving of binary information stored in a magnetic film of a beam addressable memory will now be described. A focused light beam is established incident on the region in which information has been established, preferably by a focused laser. Conveniently, the light beam can be provided by He-Ne laser emitting light having wavelength 6328 A. Several magneto-optic effects are readily available for determining the manner in which the interaction of the incident light beam with the magnetized region as result of magnetization therein alters the nature of both reflected light and transmitted light from incident light, e.g., Faraday rotation, longitudinal Kerr effect, and transverse Kerr effect.

The ferromagnetic materials suitable for the practice of this invention include transition metals and alloys, rare-earth metals and alloys, rare-earth compounds, and mixed compounds and alloys of the foregoing. Included in the transition metals and alloys, which are usually ferromagnetic above approximately 20° C., are: Fe, Ni, Co, FeNi, FeCo, NiCo, FeNiCo; and various ternary and quaternary alloys containing at least Fe, Ni, or Co. Included in the rare-earth metals and alloys, which usually are ferromagnetic below approximately 20° C., are Gd, No, Dy, and Tb and the alloys thereof. Included in the rare-earth compounds are oxides, e.g., EuO; nitrides, e.g., GdN, tellurides, e.g., EuTe; and sulphides e.g., EuS.

The practice of this invention will now be described with reference to the figures. In FIG. 1 a substrate 10 e.g., of quartz or glass, has a plane surface 12 upon which are established a series of parallel conductors 14, e.g., of copper, as by vapor deposition or electroplating. Alternate members of the parallel conductors 14 are electrically interconnected, and an electrical potential is applied across alternate pairs of the conductors 14 by battery 16 in series with variable resistance 18, resistance 24, and switch 20. When switch 20 is in closed position, an electric field is established adjacent the plane of the surface 12 of substrate 10. One terminal of battery 16 is connected to ground 22 via resistance 24, and the *y* input of an *x–y* recorder, not shown, is connected to terminal 25 of an *x–y* recorder, not shown. The electric field lines established by the applied potential between adjacent pairs of conductors 14 are indicated by arrows 28. The substrate 10 with conductors 14 established on the surface 12 thereof is placed in the evaporator unit 30 of FIG. 2 in vapor deposition relationship with the source 32 of the components of the magnetic film to be deposited on surface 12.

Figure 2:
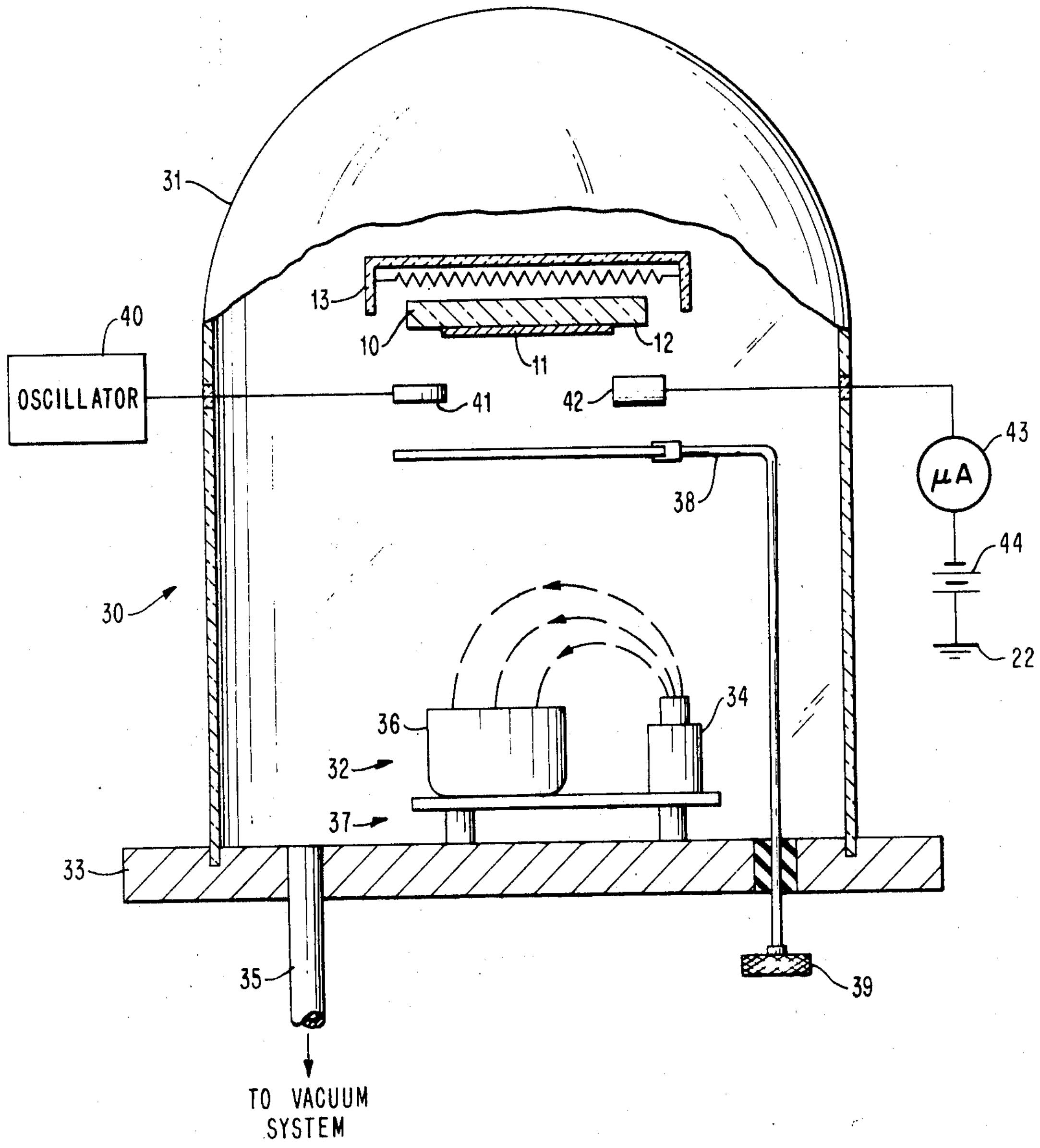
FIG. 2 is a schematic diagram of an evaporation system whereby a magnetic material is deposited on a substrate as provided in FIG. 1.

Evaporator unit 30 is illustrated schematically in FIG. 2. The substrate 10 is established in position, by a mount not shown, under evaporation shell 31 in receptive position for receiving components of a magnetic film from source 32, to establish magnetic film 11 on surface 12 of substrate 10. The magnetic film 11 is shown as extending over only a portion of surface 12 because the mount, not shown, for substrate 10 blocks deposition from a portion of the surface. Resistive heating unit 13 is positioned above substrate 10 and heats the surface 12 thereof to a predetermined temperature. Source 32 consists of an electron gun 34 and receptacle 36 placed on pedestal 37. The dashed lines between electron gun 34 and receptacle 36 indicate paths of electrons which are bent by an applied magnetic field, not shown. The components of the magnetic film are established in receptacle 36, e.g., Ni and Fe in predetermined ratio so that the film 11 be of Ni-Fe with 81/19 ratio of Ni and Fe. Other conventional aspects of the evaporator arrangement are a shutter 38 positionable by knob 39, crystal oscillator 40, crystal 41, and ion collector plate 42. The crystal 41, e.g., a quartz crystal causes oscillator 40 to operate at graduation of frequencies dependent on the thickness of magnetic film deposited on the crystal surface. Therefore, by monitoring the frequency of oscillator 40, there is obtained a measure at any selected time of the thickness of film 11 deposited on surface 12 of substrate 10. The ion collector plate 42 is connected via microammeter 43 and battery 44 to ground 22. The current monitored by microammeter 43 due to collection of ions by ion collector plate 42 is a measure of the degree of ionization of the components of the magnetic film 11 being transported from receptacle 36 to substrate surface 12. The vacuum in the volume defined by shell 31 and base 33 is established via pipe 35 connected to a conventional vacuum system, not shown. Background literature which provides detailed information about evaporation units and thin film technology useful for the practice of this invention are:

(a) "Thin-Film Components and Circuits" by N. Schwartz et al., Physics of Thin Films—Advances in Research and Development, vol. 2, 1964 Academic Press, pages 363–425.

(b) "Focused-Beam Electron Bombardment Evaporator" by D. H. Blackburn et al., The Review of Scientific Instruments, vol. 36, No. 7, July 1965, pages 901–903.

(c) Vacuum Deposition of Thin-Films, by L. Holland, John Wiley and Sons, Inc., 1960.

Figure 3A:
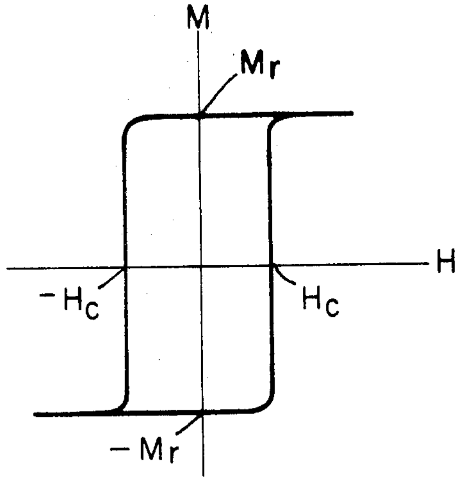
FIGS. 3A, 3B, and 3C are line diagrams illustrating physical parameters of a magnetic film.
Figure 3B:
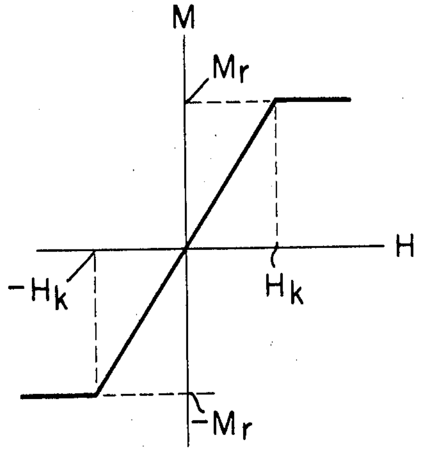
Figure 3C:
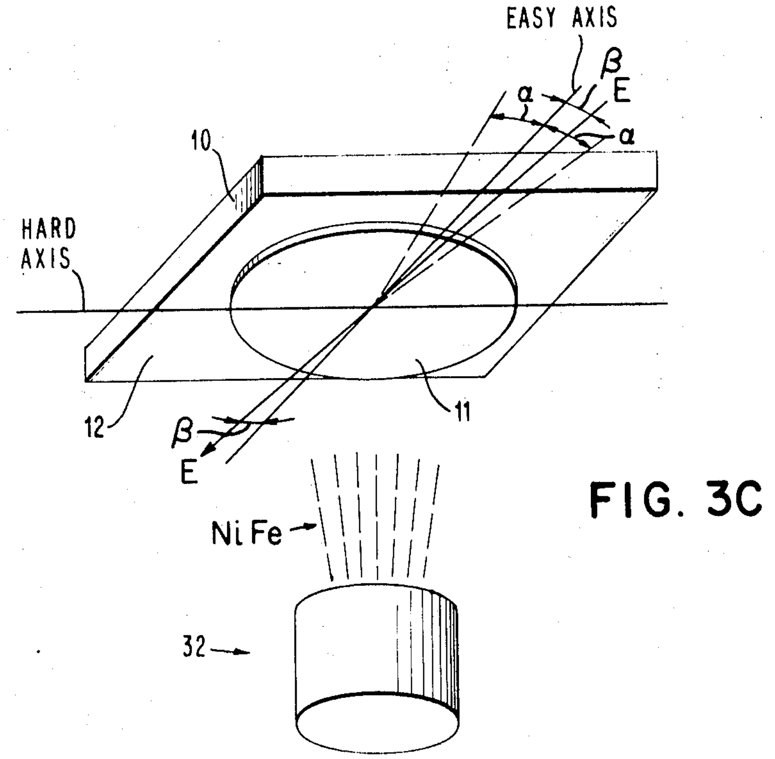

FIGS. 3A, 3B, and 3C are line drawings which present parameters of a magnetic film useful for discussion of this invention. In FIG. 3A a rectangular hysteresis loop is set forth with respect to the horizontal axis field H, and the vertical axis magnetization M, which has positive and negative coercive forces $H_c$ and $-H_c$. The coercive force measures an important criterion in the selection of ferromagnetic materials for practical applications. It is a measure of the strength of the magnetic field required to change the state of magnetization, e.g., from remanent state $-M_r$ to remanent state $M_r$. In FIG. 3A, which is representative of the hysteresis curve for the hard axis of a magnetic film in accordance with this invention, the positive and negative anisotropy fields are $H_k$ and $-H_k$. In FIG. 3C the resultant magnetic film 11 is shown established on substrate 10. The easy axis is shown in the direction of the applied electric field, and the hard axis is shown at right angle to the easy axis. For convenience of discussion, the source of magnetic material 32, shown in greater detail in FIG. 2, is shown as presenting partially ionized Ni and Fe to substrate 10 to form film 11. A convenient parameter of a magnetic film is the solid angle $\alpha$ which is indicative that 90 percent of the local ferromagnetic anisotropy is directed at least within it. The skew $\beta$ is the angle between the direction of the applied electric field E and the easy axis of the induced anisotropy.

Figure 4:
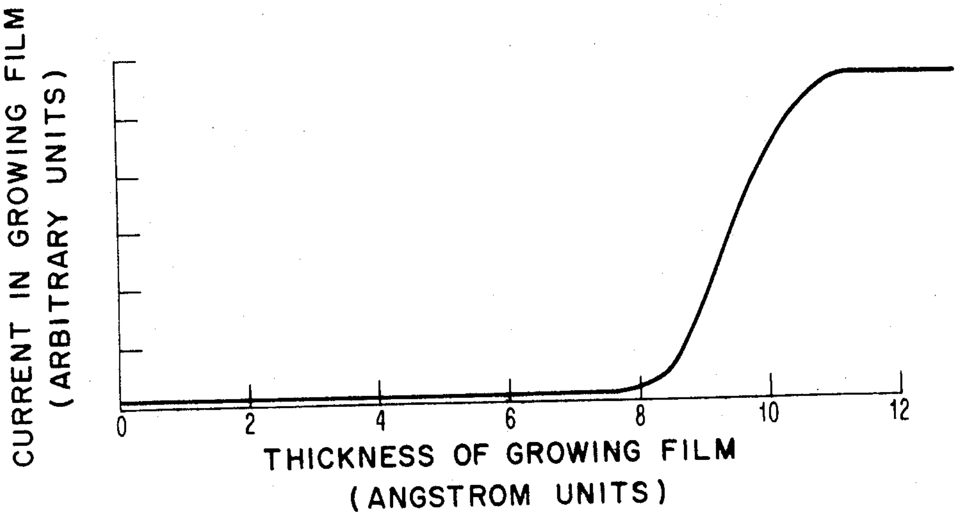
FIG. 4 presents a graph of experimental data of current, on an arbitrary scale, which flows through the growing magnetic film plotted against the thickness of the film in Angstrom units illustrating that the film is essentially an insulator for a period of time during its growth until the thickness reaches a certain magnitude at which the film becomes a conducting medium.
Figure 5:
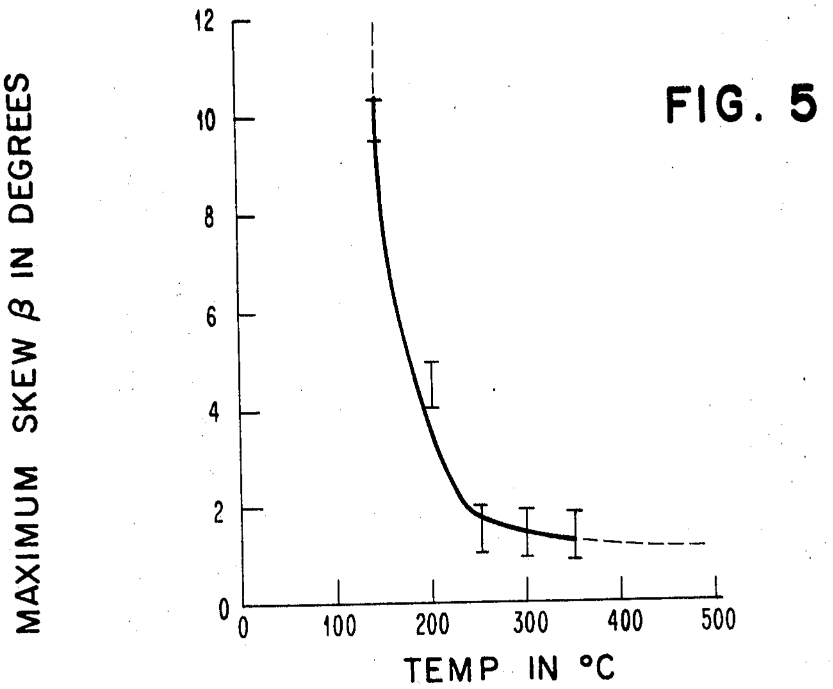
FIG. 5 presents a graph of experimental data of the maximum skew in angular degrees of the easy axis in an anisotropic film plotted versus the substrate temperature for an applied initial field of 1500 volts/cm. for different values of temperature during the growth of a magnetic film according to the practice of this invention.
Figures 6, 7:
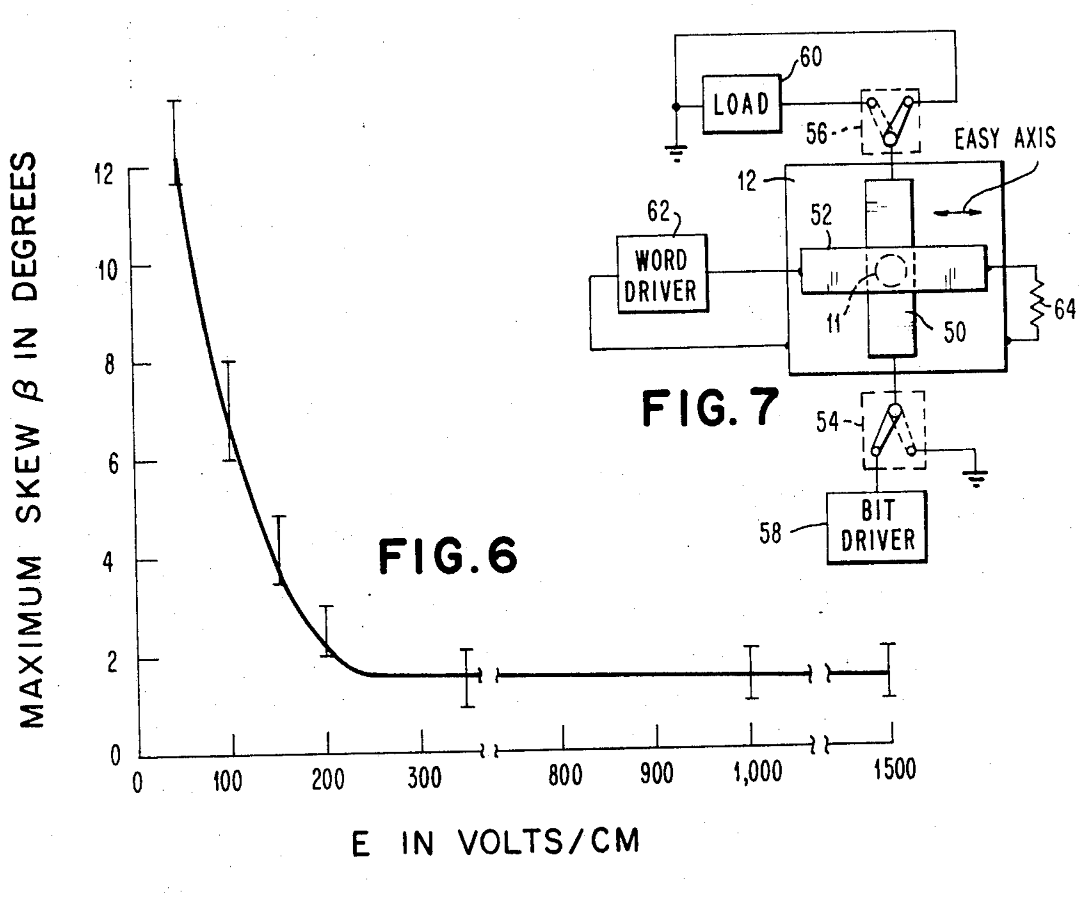
FIG. 6 is a graph of experimental data of the maximum skew in angular degrees of the easy axis of the induced anisotropy of a film according to the practice of this invention plotted versus the magnitude of the applied electric field in volts/cm. for a film of ultimate thickness of 1000 Angstroms grown on a substrate surface held at temperature of 350° C.
FIG. 7 illustrates use of a magnetic film provided by the practice of this invention incorporated in an information storage system.

The practice of this invention will be further exemplified by reference to FIGS. 4 to 6 which present experimental data verifying the discovery for the practice of this invention and presenting the ranges of parameters desirable for controlling the anisotropy induced in a magnetic film according to the premise of this invention. The current flowing in the film deposited on the substrate 10 is presented on the ordinate axis on an arbitrary scale, and the thickness of the film in Angstrom units is presented on the abscissa scale. Inspection of the curve of FIG. 4 reveals that the film is essentially nonconducting for a thickness up to approximately 8 Angstrom units at which it begins to conduct. As the film grows to approximately 10 Angstrom units thickness, it finally becomes fully conducting according to the conductivity of the film of a magnetic material having that thickness. The curve of FIG. 4 substantiates the hypothesis that during the growth of the film, islands of magnetic material form so that there is a discontinuous film on the substrate until the islands rapidly coalesce as the film thickness increases between 8 Angstroms and 10 Angstroms.

The skew $\beta$ of the easy axis in a film having induced anistropy according to the practice of this invention indicates the angular orientation of the easy axis relative to the direction of the applied electric field. It has been determined for the practice of this invention that there is a relationship between the maximum skew in angular degrees and the temperature of the surface 12 of the substrate 10 for a given electric field in the plane of the magnetic film 11. The experimental data verifying this determination is presented in FIG. 5. The graph of FIG. 5 indicates that the skew is strongly dependent on the temperature from about 150° C. to 250° C. Above 250° C., the skew is substantially constant with increasing temperature. Therefore, it is preferable for the practice of this invention to maintain the temperature of the surface 12 of a substrate 10 upon which a film 11 is established at a temperature at least as high as 250° C. for a film of 81/19 Ni-Fe. Since it is the surface temperature of the substrate which is the important parameter, exemplified by the graph of FIG. 5, the surface can also be maintained at an appropriate temperature by radiant energy without necessitating that the entire substrate be maintained at that temperature.

Further, the skew of the easy axis from the direction of the applied electric field is indicated by the graph of FIG. 6 which presents a plot of the maximum skew in degrees versus the applied electric field for a magnetic film produced on a substrate maintained at approximately 350° C. The value of the skew of the graph of FIG. 6 is measured for several films 11 having a thickness of 1000 Angstrom units. The graph of FIG. 6 indicates that the skew is essentially constant and has a very low level for an electric field above approximately 200 volts/cm. in the plane of the growing film, and that the maximum skew rises sharply with relatively small change in the applied electric field. Accordingly, it is possible to control the value of the skew by controlling the value of the applied electric field. Preferably, for a magnetic film of 81/19 Ni-Fe with uniformly induced anisotropy, it is desirable that the applied electric field be at least 200 volts/cm.

There is shown in FIG. 7 an embodiment of an information system which, for purposes of illustration only, is limited to a single magnetic film 11 provided by the practice of this invention deposited on a substrate 12, e.g., an electrically conductive ground plane, with an insulative layer on the surface thereof. The easy axis of the film 11 is indicated by the double-headed arrow as being in the horizontal direction. A first or bit line 50 is deposited over the film 11 on the substrate or ground plane 12 in a direction orthogonal to the easy axis of the film 10, and a second or word line 52 is also deposited over the film 11 on the substrate or ground 12 but in a direction parallel to that of the easy axis. The magnetic film 11 is illustrated as having a circular shape; but it may have other shapes, such as rectangular, if desired. The bit and word lines 50 and 52 are preferably strip lines having a width at least as wide as the diameter of the film 11 with overlapping portions of the lines 50 and 52 disposed directly above the film 11. A layer of insulation (not shown), for example silicon monoxide, is interposed between the two lines 50 and 52; and additional insulating layers may be provided on each side of the film 11. The bit line 52 is connected at one end to a first switching means 54 and at the other end to a second switching means 56. The first switching means 54 is operative to connect the one end of the bit line 50 either to a bit driver or generator 58 or to ground, while the second switching means 56 is operative to connect the other end of the bit line 50 either to ground or to a load 60 which may be a conventional sense amplifier. The word line 52 is connected at one end to a word driver or generator 62 and at the other end to the characteristic impedance 64 of the word line 52. The first and second switching means 54 and 56 are preferably ganged so that when the one end of bit line 50 is connected to the bit driver 58 by the first switching means 54, the other end of the bit line 50 is connected to ground by the second switching means 56; and, when the other end of the bit line 50 is connected by the second switching means 56 to the load 60, the one end of the bit line 50 is connected by the first switching means 54 to ground. By providing the first and second switching means 54 and 56, the bit line 50 can act as a common bit and sense line. If the switching means 54 and 56 are not used, a third line similar to the bit line 50 is provided as a sense line. If desired, an end of the bit line 50 may also be selectively terminated by its characteristic impedance instead of being connected directly to ground. When the substrate 12 is a ground plane, it is used as the return path for the bit and word lines.

THEORY OF THE INVENTION

Prior art literature articles of background interest for a theory of this invention are:

(a) "Possible Influence of Electric Charge Effects on the Initial Growth Processes Occurring During the Vapor Deposition of Metal Films onto Substrates Inside the Electron Microscope" by D. B. Dove, Journal of Applied Physics, 35, 2785 (1964).

(b) "Growth of Thin Metal Films Under Applied Electric Field" by K. L. Chopra, Applied Physics Letters, 7, 140 (1965).

It has been discovered for the practice of this invention that an applied electric field can induce uniaxial anisotropy in a magnetic film. In the practice of this invention, partially charged components of the ultimate magnetic film are deposited from the vapor state onto a substrate in the presence of the applied electric field. Through control of the magnitudes of the electric field, temperature of the surface of the substrate, and degree of ionization of the components of the magnetic material during deposition on the substrate, the magnitude and direction of the uniaxial anisotropy of the film are controlled.

Atoms are condensed onto a substrate and form discrete nuclei during the initial stage of film growth through vapor deposition. Several factors determine the size and distribution of the nuclei, e.g., the melting point of the evaporant, substrate temperature, degree of vacuum, and nature of the substrate surface. Some of the nuclei grow through coalescence with other nuclei to form island-like structures. The resulting island-like structures coalesce with each other in a liquid-like manner to form finally a continuous film on the substrate.

It has been observed in the prior art literature that if an electric field is applied in the plane of the film during its deposition, coalescence of the island-like structures occurs earlier than for a comparable film produced in the absence of an electric field. In addition to the earlier coalescence of the island-like structures in the presence of an electric field, it has also been observed in the prior art literature that the orientation of the resultant crystal structure is slightly enhanced. It was also known in the prior art that if the vapor components are partially charged, there is a resultant increase in nucleation rate on the substrate. In addition, it was known in the prior art that a net electrostatic force can be present between charged particles of different size where both charges are of like signs.

Through the electrostatic attraction, the charged particles move under the influence of the applied electric field and their merger into island-like structure is assisted. It has been observed in the prior art that coalescence of particles into island-like structures along the applied electric field direction has produced oriented growth processes in the direction of the electric field. Further, the normal spherical shape of the resultant island-like structures is distorted by the presence of charges thereon. It is hypothesized for the practice of this invention that this distortion contributes to the uniaxial anisotropy of the magnetic films obtained through the practice of the invention.

EXPERIMENTS FOR THE INVENTION

In experiments for the practice of this invention, an electric field is established in the plane of a substrate upon which a series of parallel conductors are present as through previous vapor deposition. Illustrative suitable conductors are of gold, silver, or copper. By establishing equally spaced conductors 14 (FIG. 1) and applying the same voltage between adjacent conductors, as by connecting in parallel alternate conductors and connecting each group to the opposite terminals of a voltage supply, an essentially uniform electric field 28 is established in the plane of film 11 (FIG. 3C) on the substrate 10. Illustratively, a source 36 (FIG. 2) of Ni-Fe evaporant of suitable concentration for a magnetic film 11 of 81/19 ratio of Ni/Fe is established in vapor deposition relationship to surface 12 of substrate 10 which is maintained at a temperature greater than 200° C. An electron gun 34 was used both to heat the magnetic material to the vapor state and partially to ionize the components. Exemplary films according to the practice of this invention were obtained when an evaporation rate, measured in rate of growth of the film, was maintained at approximately 5 A./sec. with a distance of approximately 30 cm. from source 32 to substrate 10. A quartz crystal 41 and oscillator 40 readily permitted monitoring of the evaporation rate and thickness of film 11. An ion collector system including a 4 cm.$^2$ collector plate 42 was used during deposition of film 11 for detecting the ion current which varied between 5 microamps to 15 microamps. The vacuum was maintained during evaporation in the range of $1\times10^{-5}$ torr to $5\times10^{-6}$ torr by a conventional vacuum system connected to pipe 35. For an illustrative ultimate film with a thickness of 1000 A., the applied electric field varied from 50 volts/cm. to 1500 volts/cm. during deposition of the components of the film. The magnetic properties of a resultant film were determined by a magneto-optic hysteresigraph operated at a frequency of 60 cycles per second.

There is a critical increase of film thickness at which electrical continuity is established. This is determined by monitoring the current which passes through the sampling resistor 24 (FIG. 1) by an *x–y* recorder, not shown, connected to terminal 25. Illustratively, the critical thickness is approximately 10 Angstrom units for an applied electric field of 1000 volts/cm. In contrast, a film with comparable magnetic properties deposited in the presence of a magnetic field by the prior art practice has been approximately 100 angstrom units in thickness. Approximately 1 percent of the atoms being deposited on the surface 12 of the substrate 10 (FIG. 3C) were ionized as determined by correlation of the film thickness as determined by crystal oscillator 40 (FIG. 2) and the ion current as determined via the ion collector plate 42 (FIG. 2) and microammeter 43.

It was determined experimentally for the practice of this invention that there is a lower limit of substrate temperature, e.g., approximately 250° C. for Ni-Fe film of 81/19 atomic proportion of the components, above which a well defined uniaxial anisotropy was established in the resultant film. Below a temperature of approximately 250° C. of the surface 12 of substrate 10, the orientation of the easy axis, i.e., the skew $\beta$, tended to deviate randomly from the direction of applied electric field E. It was also determined experimentally that the lower limit of electric field strength suitable for the practice of this invention was approximately 100 volts/cm. for the same magnetic material. Films of the noted magnetic material, i.e., 81/19 Ni-Fe, produced through the practice of this invention were determined experimentally to have similiar magnetic parameters as films with induced uniaxial anisotropy in accordance with the prior art practice with a magnetic field. Table I presents typical data on certain magnetic properties of an exemplary 81/19 Ni-Fe film of approximately 1000 A. thickness.

TABLE I

| | | |
|---|---|---|
| $H_c$ | Oe | −2 |
| $H_k$ | Oe | ~4.5 |
| $\alpha$ | deg | ~1 |
| Skew $\beta$ | deg | <1 |

As noted with reference to FIG. 6, through the practice of this invention, a magnetic fim of 81/19 Ni-Fe of 1000 Angstrom units thickness is readily obtained when deposition on a substrate surface maintained at approximately 350° C. Since the applied electric field is not effective for establishing uniaxial anisotropy in the film once it becomes effectively conducting, the remainder of the film is established with uniaxial anisotropy through exchange coupling with the original film layer established in the presence of the electric field. The phenomenon of exchange coupling involves the magnetization of one layer of magnetic material by the magnetization of an adjacent layer of magnetic material. If the particular magnetic material, e.g., EuO, being used for establishing the ultimate magnetic film does not have suitable magnetization at the temperature of deposition with the applied electric field, the temperature for deposition is set where the ultimate film can have suitable magnetization. Through the exchange coupling with the magnetization of the layer established with uniaxial anisotropy in the presence of the applied electric field, an ultimate film is produced having geometry, e.g., larger area, and homogeneity, e.g., greater uniformity of skew, which are not possible for a film with uniaxial anisotropy induced in the presence of a magnetic field as in the prior art.

The largest area of a magnetic film with uniaxial anisotrophy induced in the presence of a magnetic field according to the prior art practice has been approximately 9 square inches. Through the practice of this invention, a magnetic film with induced uniaxial anisotropy with uniform distribution of the easy axis can readily be provided having an area significantly greater than 9 square inches, e.g., 1000 square inches.

The exemplary 81/19 Ni-Fe magnetic film provided by the practice of this invention has been disclosed herein as being approximately 12 Angstrom units in thickness when deposited on a substrate surface maintained at approximately 350° C. in the presence of an applied electric field. Illustratively, 81/19 Ni-Fe film produced with uniaxial anisotropy in the presence of an applied electric field has greater thickness than 12 Angstrom units when the temperature of the substrate surface is higher than 350° C. Illustratively, the prior art practice has not been able to provide a magnetic film with uniaxial anisotropy which has a thickness less than approximately 35 Angstrom units. For any particular magnetic material, the largest thickness of a magnetic film with uniaxial anisotropy induced in the presence of an applied electric field by the practice of this invention is dependent on the physical characteristics of the material and the substrate surface temperature. Generally, it has been demonstrated for the practice of this invention that a magnetic film can readily be provided with uniaxial anisotropy induced in the presence of an applied electric field having a thickness less than approximately 35 Angstrom units.

Modifications of the practice of this invention include use of a conductive pattern for establishing an electric field adjacent to and contiguous with the surface of the substrate which is located below the surface of the substrate and in insulative relationship with the depositing film. For convenience of discussion, the pattern of conductors by which an electric field is established in a magnetic film during deposition has been described herein as being of parallel equal spaced conductors. It will be understood by one skilled in the art that various patterns of conductors can provide electric fields of various magnitudes and directions across a surface of a substrate. Another of the practice of the invention involves the use of an electron beam gun for ionizing the components of the magnetic material in the vapor state during their transit to the surface of the substrate.

It will be understood by one skilled in the art that the charge distributions on the island-like particles which form during deposition of the magnetic film on the substrate may be of positive sign if the ionizing procedure and the nature of the components are suitable.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Method for inducing uniaxial anisotropy in a magnetic film which exhibits non-conductivity during growth thereof comprising the steps of:
- depositing a magnetic film on a substrate; and
- establishing an electric field in a plane of said magnetic film during said deposition step to induce uniaxial anisotropy in said deposited magnetic film only when said magnetic film is substantially nonconductive.

2. The method of claim 1 wherein said deposited magnetic film during deposition is electrically charged.

3. Method for inducing uniaxial anisotropy in a magnectic film which exhibits non-conductivity during growth thereof comprising the steps of:
- vaporizing a stream of components of a magnetic film;
- ionizing partially said components of said stream;
- establishing a surface of a substrate in receptive relationship for said components of said magnetic film; and
- establishing an electric field in a plane of said magnetic film during said deposition on said substrate surface to induce uniaxial anisotropy in said magnetic film when it is substantially non-conductive.

4. Method for inducing uniaxial anisotropy in a magnetic film according to claim 3 including the step of controlling the temperature of said substrate surface to control the magnitude of said uniaxial anisotropy and direction of the easy axis thereof.

5. Method for inducing uniaxial anisotropy in a magnetic film according to claim 3 including the step of controlling the magnitude and direction of said electric field in the plane of said magnetic film to control the magnitude of said uniaxial anisotropy and direction of the easy axis thereof.

6. Method for inducing uniaxial anisotropy in a magnetic film according to claim 3 including the step of controlling the degree of ionization of said components in said vapor stream to control the rate at which said uniaxial anisotropy is induced in said magnetic film during deposition thereof on said substrate surface.

7. Method according to claim 3 wherein said magnetic film is a magnetic metal.

8. Method according to claim 3 wherein said magnetic film is a magnetic alloy.

9. Method according to claim 7 wherein said magnetic film is Ni-Fe of 81/19 atomic ratio proportion of atomic components Ni and Fe.

10. Method according to claim 3 wherein said magnetic film is primarily of EuO.

11. Method according to claim 3 wherein said magnetic film is a rare earth compound.

12. Method according to claim 3 wherein said magnetic film is an alloy GdEu.

13. Method according to claim 3 wherein said magnetic film is a rare earth alloy.

14. Method as set forth in claim 1 wherein said electric field is higher than approximately 50 volts/cm.

15. Method as set forth in claim 3 wherein said electric field is higher than approximately 50 volts/cm.

References Cited

UNITED STATES PATENTS

| | | | |
|---|---|---|---|
| 3,192,892 | 7/1965 | Hanson et al. | 118—49.1 |
| 3,290,567 | 12/1966 | Gowen | 317—234 |

FOREIGN PATENTS

| | | | |
|---|---|---|---|
| 1,059,310 | 2/1967 | Great Britain | 117—240 |

ALFRED L. LEAVITT, Primary Examiner

J. H. NEWSOME, Assistant Examiner

U.S. Cl. X.R.

117—93, 93.3; 340—174